us009762711B2

United States Patent
He et al.

(10) Patent No.: US 9,762,711 B2
(45) Date of Patent: Sep. 12, 2017

(54) EJECTING MECHANISM OF A PRIMARY AND SECONDARY MACHINE MODULE, AND PRIMARY AND SECONDARY MACHINE MODULE AND PRIMARY MACHINE THEREWITH

(71) Applicant: QISDA (SUZHOU) CO., Ltd., Suzhou, Jiangsu Province (CN)

(72) Inventors: Shun Cai He, Suzhou (CN); Li Bing Chen, Suzhou (CN); Hai Dong Wang, Suzhou (CN); Qi Yun Shen, Suzhou (CN); Xiao Jun Xu, Suzhou (CN); Chun Yang Chen, Suzhou (CN)

(73) Assignee: QISDA (SUZHOU) CO., Ltd., Suzhou, Jiangsu Province (CN)

( * ) Notice: Subject to any disclaimer, the term of this patent is extended or adjusted under 35 U.S.C. 154(b) by 18 days.

(21) Appl. No.: 14/735,161

(22) Filed: Jun. 10, 2015

(65) Prior Publication Data

US 2016/0028186 A1    Jan. 28, 2016

(30) Foreign Application Priority Data

Jul. 22, 2014   (CN) .......................... 2014 1 0348814

(51) Int. Cl.
*H01R 13/635*    (2006.01)
*H04M 1/02*      (2006.01)
*G06K 13/08*     (2006.01)

(52) U.S. Cl.
CPC ...... *H04M 1/0256* (2013.01); *G06K 13/0856* (2013.01); *H01R 13/635* (2013.01)

(58) Field of Classification Search
CPC ................ H01R 13/633; H01R 13/635; G06K 13/0856; G06K 13/02; G06K 13/08; H04M 1/0256

(Continued)

(56) References Cited

U.S. PATENT DOCUMENTS 4,887,188 A * 12/1989 Yoshida ............. G06K 13/0806
                                              361/679.31
6,270,365 B1 * 8/2001 Nishioka ................ G06K 13/08
                                                    439/159

(Continued)

FOREIGN PATENT DOCUMENTS

CN       1522423 A      8/2004
CN       102223423 A    10/2011
WO       2003003289 A1  1/2003

*Primary Examiner* — Renee Luebke
*Assistant Examiner* — Paul Baillargeon
(74) *Attorney, Agent, or Firm* — Winston Hsu

(57) ABSTRACT

An ejecting mechanism provides an ejecting executing portion driven by an ejecting driving portion for pushing a secondary machine out of a primary machine and for separating a secondary connector and a primary connector connected to each other. It allows the secondary machine to be ejected out of the primary machine automatically and prevents damage of the secondary connector and the primary connector caused by applying an external pulling force on the secondary machine directly. Furthermore, when a first external force overcomes a resilient driving force to push the secondary machine into a slot, the ejecting executing portion contacting with the secondary machine swings toward a rear end of a connecting surface of the primary connector. Additionally, an ejecting locking portion moving with the swing of the ejecting executing portion can be locked by a locking executing portion, such that the automatic ejection of the secondary machine is restrained.

18 Claims, 14 Drawing Sheets

(58) Field of Classification Search
USPC ....... 439/367, 347, 345, 308, 152, 153, 155, 439/157, 159, 39, 630, 607.22
See application file for complete search history.

(56) References Cited

U.S. PATENT DOCUMENTS

| | | | |
|---|---|---|---|
| 6,587,350 B1* | 7/2003 | Lin ...................... | H05K 7/1411 361/754 |
| 8,747,131 B2* | 6/2014 | Nakase .............. | G06K 13/0831 439/159 |
| 9,396,416 B2* | 7/2016 | Matsumoto ........ | G06K 13/0812 |
| 2015/0333444 A1* | 11/2015 | Wang ................... | H01R 13/633 439/159 |

* cited by examiner

EJECTING MECHANISM OF A PRIMARY AND SECONDARY MACHINE MODULE, AND PRIMARY AND SECONDARY MACHINE MODULE AND PRIMARY MACHINE THEREWITH

BACKGROUND OF THE INVENTION

1. Field of the Invention

The present invention relates to an assembling technology of a primary and secondary machine module, and more specifically, to an ejecting mechanism of a primary and secondary machine module, and the primary and secondary machine module and a primary machine therewith.

2. Description of the Prior Art

In order to satisfy requirements of users, an electronic device can be designed in the form of a primary and secondary machine module. The primary and secondary machine module can not only achieve combination of two electronic devices, but also be separated into two independent electronic devices. For example, a mobile phone and a tablet computer are respectively regarded as a secondary machine and a primary machine. The tablet computer, which is regarded as the primary machine, has a slot. The mobile phone, which is regarded as the secondary machine, is inserted into the slot of the tablet computer, so as to achieve combination of the mobile phone and the tablet computer in the form of the primary and secondary machine module. When the mobile phone, which is regarded as the secondary machine, is detached from the slot of the tablet computer, the mobile phone and the tablet computer can provide corresponding functions as two single independent electronic devices.

When the secondary machine is inserted into the primary machine, the secondary machine and the primary machine communicate and are fixed with each other by connectors. However, since the connectors cannot afford an extreme external force, when a user detaches the connectors of the primary machine and the secondary machine, which are connected with each other, by applying an external pulling force, the secondary machine can be pulled out of the slot of the primary machine. However, the external pulling force applied on the secondary machine might damage the connectors easily.

SUMMARY OF THE INVENTION

The present invention provides an ejecting mechanism for a primary and secondary machine module, and the primary and secondary machine module and a primary machine therewith, so as to achieve a purpose of automatic ejection of a secondary machine from the primary machine in a condition of avoiding interfering connection between the secondary machine and primary machine.

According to the claimed invention, an ejecting mechanism for a primary and secondary machine module is disclosed. A primary machine of the primary and secondary machine module has a slot whereinto a secondary machine of the primary and secondary machine module is inserted. A primary connector is disposed at a bottom side of the slot. A secondary connector is disposed at a bottom side of the secondary machine for connecting with the primary connector, and the ejecting mechanism includes an ejecting executing portion, an ejecting driving portion, an ejecting locking portion, a locking executing portion, a locking retaining portion, and a releasing driving portion. The ejecting executing portion swings back and forth between a front end and a rear end of a connecting surface of the primary connector. The ejecting driving portion generates a resilient driving force to swing the ejecting executing portion toward the front end of the connecting surface of the primary connector. The ejecting locking portion moves synchronously along with swing of the ejecting driving portion. When a first external force overcomes the resilient driving force to push the secondary machine into the slot, so as to connect the secondary connector with the primary connector, the ejecting executing portion contacting with the secondary machine swings to the rear end of the connecting surface of the primary connector, such that the ejecting locking portion is located at a locking position. The locking executing portion moves back and forth along a direction close to or away from the locking position, and the locking executing portion engages with the ejecting locking portion at the locking position. The locking retaining portion is for generating a resilient retaining force to retain the locking executing portion close to the locking position. The releasing driving portion is for driving the locking executing portion to move away from the locking position under a second external force overcoming the resilient retaining force.

Preferably, the ejecting locking portion is formed on the ejecting executing portion or the secondary machine.

Preferably, the releasing driving portion acted by the second external force further generates an auxiliary pushing force along a direction of the resilient driving force for the ejecting executing portion swinging to the rear end of the connecting surface of the primary machine, and a resultant force of the ejecting driving force and the auxiliary pushing force is larger than a coupling force between the secondary connector and the primary connector.

Preferably, the resilient driving force is larger than a coupling force between the secondary connector and the primary connector.

Preferably, a hollow area is formed on the ejecting executing portion for dodging the primary connector when the ejecting executing portion swings.

Preferably, the ejecting executing portion is a flat structure, and the hollow area is formed on a middle portion of the flat structure.

Preferably, the resilient driving force is a torsional force applying on a shaft of the ejecting executing portion.

Preferably, the ejecting driving portion is a torsional spring.

Preferably, the ejecting locking portion comprises an engaging hook and the locking executing portion comprises an engaging block, or the ejecting locking portion comprises an engaging hole and the locking executing portion comprises an engaging rod for inserting into the engaging hole.

Preferably, the resilient retaining force is a linear force.

Preferably, the locking retaining portion is a linear spring.

Preferably, the locking executing portion and the releasing driving portion are linked with each other in a sliding manner along different directions, in a sliding manner along a same direction, or in a manner of conversion of rotation and sliding.

Preferably, the locking executing portion and the releasing driving portion are linked with each other in the sliding manner by an inclined surface, in a manner of integral formation of the locking executing portion and the releasing driving portion, or in a manner that the releasing driving portion drives the locking executing portion to rotate by sliding.

Preferably, the ejecting mechanism further includes an ejecting buffering portion for generating an attracting force between the slot and the secondary machine disengaging from the primary connector.

Preferably, the ejecting buffering portion includes a pair of magnets respectively installed on the slot and the secondary machine, and a distance between the magnet installed on the slot and the primary connector is greater than a distance between the magnet installed on the secondary machine and a connecting port of the secondary connector.

Preferably, the ejecting executing portion is a flat structure, a hollow area is formed on a middle portion of the flat structure, the ejecting driving portion is a torsional spring installed on a shaft of the ejecting executing portion, the ejecting locking portion comprises an engaging hole formed on the secondary machine, the locking executing portion comprises an engaging block and an engaging rod formed on the engaging block for engaging with the engaging hole, the locking retaining portion is a linear spring for pushing the engaging block to slide, and the releasing driving portion and the engaging block are linked with each other in a sliding manner along different directions by an inclined surface.

Preferably, the ejecting executing portion is a flat structure, a hollow area is formed on a middle portion of the flat structure for dodging the primary connector when the flat structure swings, the ejecting driving portion is a torsional spring installed on a shaft of the ejecting executing portion, the ejecting locking portion comprises a engaging hook formed on the ejecting executing portion, the locking executing portion comprises an engaging block cooperating with the engaging hook, the releasing driving portion and a second hook are integrally formed, and the locking retaining portion is a linear spring for pushing the locking executing portion formed with the second hook.

Preferably, the ejecting executing portion is a flat structure, a hollow area is formed on a middle portion of the flat structure for dodging the primary connector when the flat structure swings, the ejecting driving portion is a torsional spring installed on a shaft of the ejecting executing portion, the ejecting locking portion comprises an engaging hole formed on the secondary machine, the locking executing portion comprises a swinging rod and an engaging rod formed on an end of the swinging rod and cooperating with the engaging hole, the releasing retaining portion is a linear spring located at the end of the swinging rod and pushes the engaging rod to rotate around a shaft of the swinging rod, and the releasing driving portion contacts with the other end of the swinging arm, so as to slide and be linked with the swinging arm by pushing the engaging rod to rotate around the shaft of the swinging rod.

According to the claimed invention, a primary machine applied for accommodating a secondary machine is disclosed. The primary machine includes a slot, a primary connector, and an ejecting mechanism. The slot is whereinto the secondary machine is inserted. The primary connector is installed at the bottom side of the slot for connecting with the secondary machine. The ejecting mechanism includes an ejecting executing portion, an ejecting driving portion, an ejecting locking portion, a locking executing portion, a locking retaining portion, and a releasing driving portion. The ejecting executing portion swings back and forth between a front end and a rear end of a connecting surface of the primary connector. The ejecting driving portion generates a resilient driving force to swing the ejecting executing portion toward the front end of the connecting surface of the primary connector. The ejecting locking portion moves synchronously along with swing of the ejecting driving portion. When a first external force overcomes the resilient driving force to push the secondary machine into the slot, so as to connect a secondary connector with the primary connector, the ejecting executing portion contacting with the secondary machine swings to the rear end of the connecting surface of the primary connector, such that the ejecting locking portion is located at a locking position. The locking executing portion moves back and forth along a direction close to or away from the locking position, and the locking executing portion engages with the ejecting locking portion at the locking position. The locking retaining portion is for generating a resilient retaining force to retain the locking executing portion close to the locking position. The releasing driving portion is for driving the locking executing portion to move away from the locking position under a second external force overcoming the resilient retaining force.

According to the claimed invention, a primary and secondary machine module is disclosed. The primary and secondary machine module includes a primary machine, a secondary machine, and an ejecting mechanism. The primary machine includes a slot whereinto the secondary machine is inserted, and a primary connector installed at the bottom side of the slot for connecting with the secondary machine. The ejecting mechanism includes an ejecting executing portion, an ejecting driving portion, an ejecting locking portion, a locking executing portion, a locking retaining portion, and a releasing driving portion. The ejecting executing portion swings back and forth between a front end and a rear end of a connecting surface of the primary connector. The ejecting driving portion is for generating a resilient driving force to swing the ejecting executing portion toward the front end of the connecting surface of the primary connector. The ejecting locking portion moves synchronously along with swing of the ejecting driving portion. When a first external force overcomes the resilient driving force to push the secondary machine into the slot, so as to connect a secondary connector with the primary connector, the ejecting executing portion contacting with the secondary machine swings to the rear end of the connecting surface of the primary connector, such that the ejecting locking portion is located at a locking position. The locking executing portion moves back and forth along a direction close to or away from the locking position, and the locking executing portion engages with the ejecting locking portion at the locking position. The locking retaining portion is for generating a resilient retaining force to retain the locking executing portion close to the locking position. The releasing driving portion is for driving the locking executing portion to move away from the locking position under a second external force overcoming the resilient retaining force.

In summary, the ejecting mechanism of the present invention provides the ejecting executing portion, which is driven by the ejecting driving portion, for pushing the secondary machine out of the primary machine and for separating the secondary connector and the primary connector which are connected to each other. It allows the secondary machine to be ejected out of the primary machine automatically and prevents damage of the secondary connector and the primary connector caused by applying an external pulling force on the secondary machine directly. Furthermore, when the first external force overcomes the resilient driving force to push the secondary machine into the slot such that the secondary connector is connected to the primary connector, the ejecting executing portion contacting with the secondary machine swings to the rear end of the connecting surface of the primary connector. Additionally, the ejecting locking portion moving with the swing of the ejecting executing portion can be locked by the locking executing portion, such that the automatic ejection of the secondary machine is restrained.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
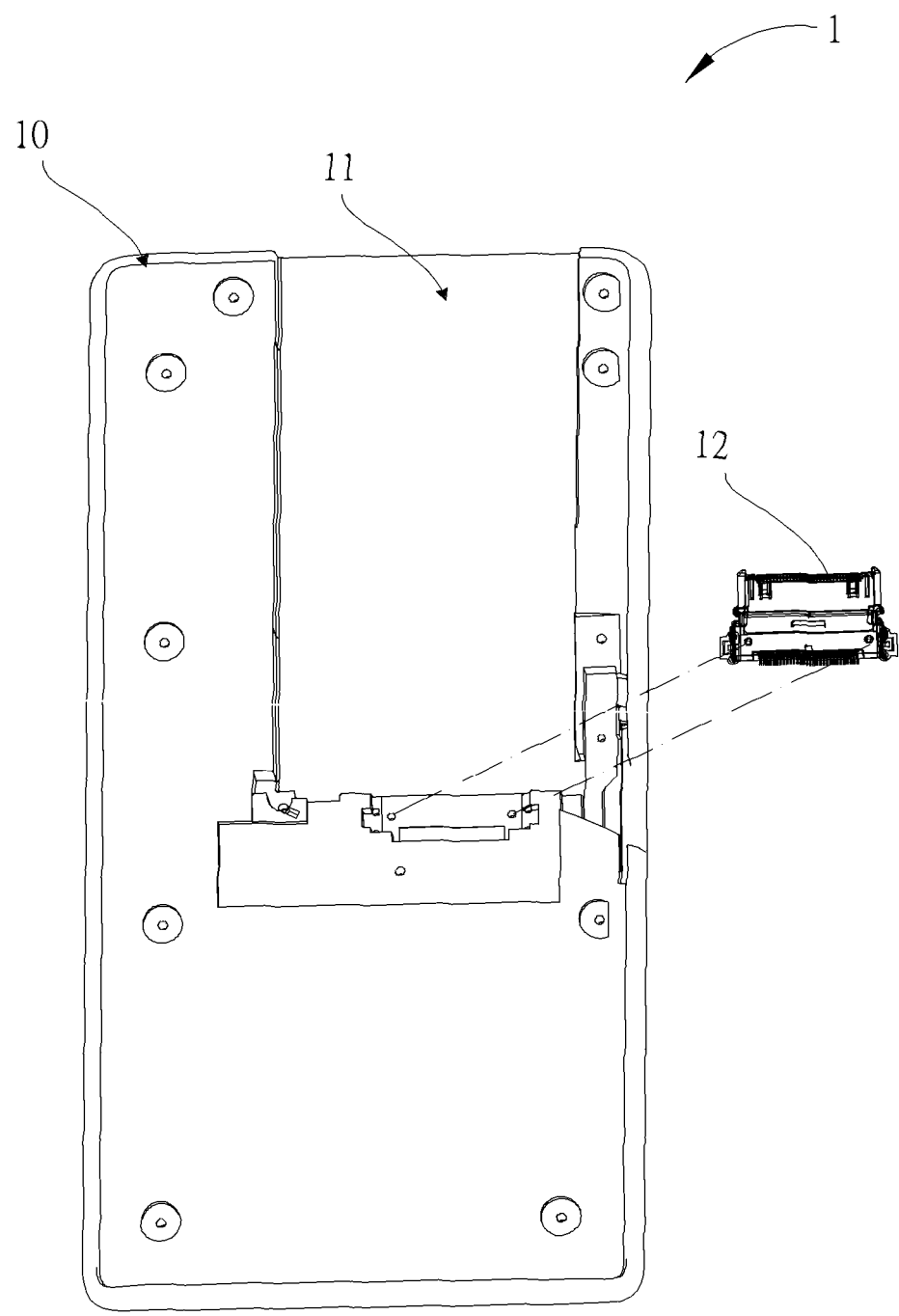
FIG. 1 is a schematic diagram of a primary machine of a primary and secondary machine module of the present invention.
Figure 2:
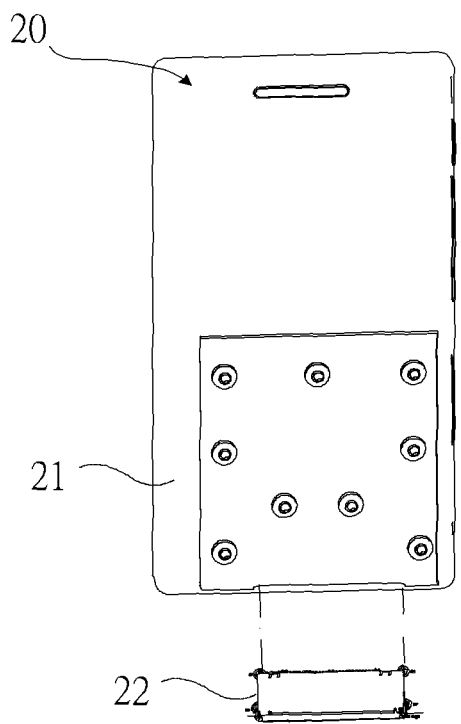
FIG. 2 is a schematic diagram of a secondary machine of the primary and secondary machine module of the present invention.

Please refer to FIG. 1 and FIG. 2. FIG. 1 is a schematic diagram of a primary machine 10 of a primary and secondary machine module 1 of the present invention. FIG. 2 is a schematic diagram of a secondary machine 20 of the primary and secondary machine module 1 of the present invention. The primary machine 10 of the primary and secondary machine module 1 has a slot 11 whereinto the secondary machine 20 is inserted, and a primary connector 12 is disposed at a bottom side of the slot 11. Correspondingly, the secondary machine 20 of the primary and secondary machine module 1 has a casing 21 and a secondary connector 22. A shape of the casing 21 matches a shape of the slot 11, and the secondary connector 22 is capable of connecting with the primary connector 12 as the secondary machine 20 is inserted into the slot 11 of the primary machine 10. The secondary connector 22 is disposed at a bottom side of the secondary machine 20 and partially disposed inside the casing 21.

When the secondary machine 20 is inserted into the slot 11 of the primary machine 10, the secondary connector 22 is connected with the primary connector 12, and a coupling force is formed between the secondary connector 22 and the primary connector 12, so as to keep the secondary machine 20 inside the slot 11 of the primary machine 10. Correspondingly, when it is desired to pull the secondary machine 20 out of the slot 11 of the primary machine 10, the coupling force between the secondary connector 22 and the primary connector 12 has to be eliminated.

However, instead of directly applying an external pulling force on the secondary machine 20 to eliminate the coupling force, the present invention provides an ejecting mechanism adapted for the aforementioned primary and secondary machine module 1. The detailed description of the ejecting mechanism of the primary and secondary machine module 1 and embodiments therewith is described as follows.

Figure 3A:
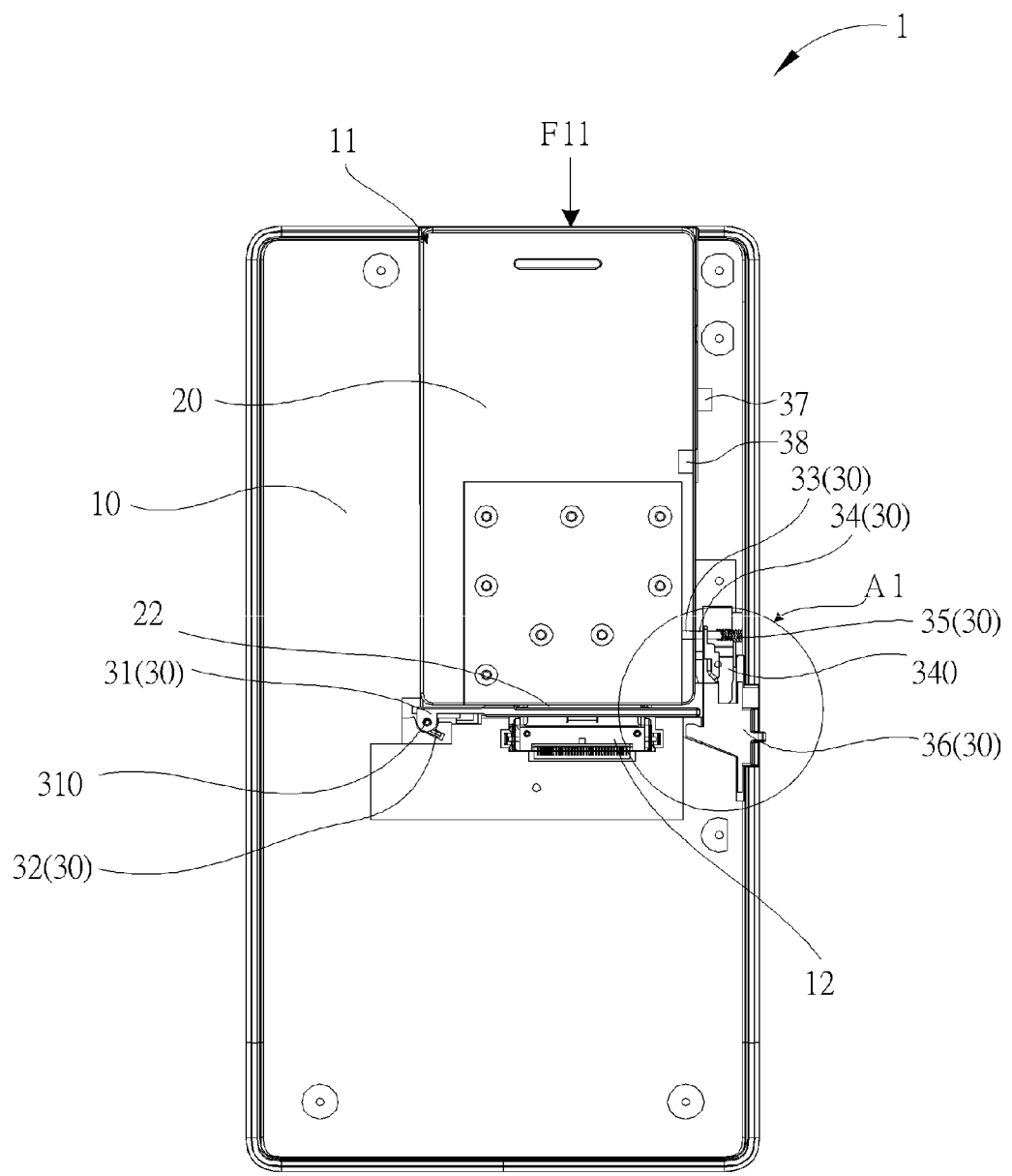
FIG. 3A and FIG. 3B are schematic diagrams of a primary and secondary machine module with an ejecting mechanism according to a first embodiment of the present invention.
Figure 3B:
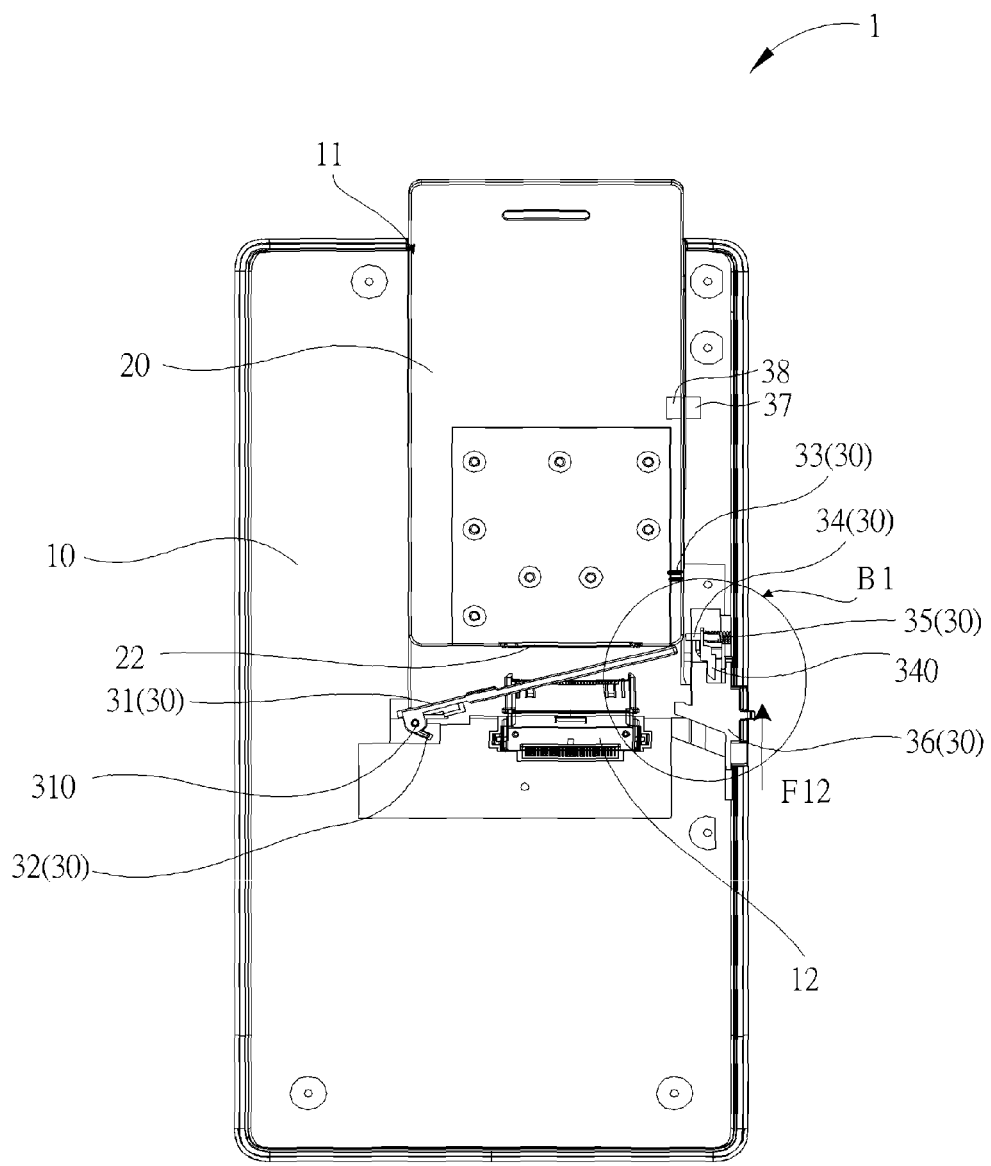
Figure 4A:
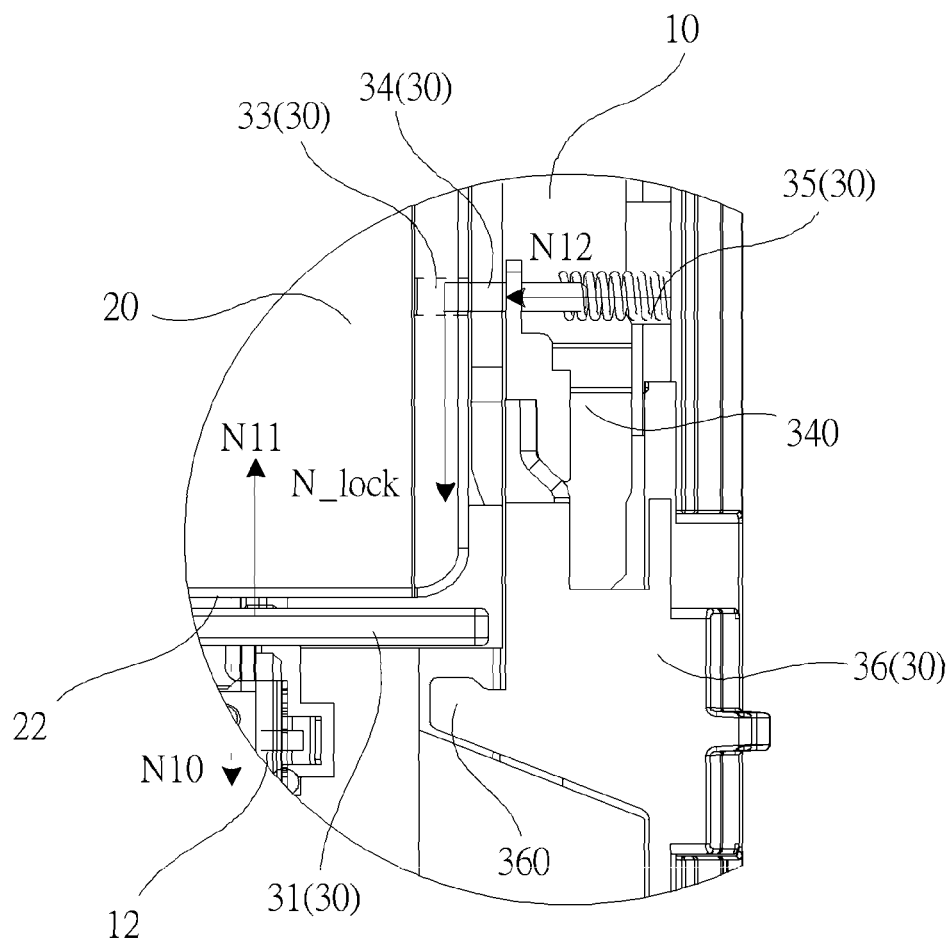
FIG. 4A and FIG. 4B are partial enlarged diagrams respectively illustrating an A1 portion in FIG. 3A and a B1 portion in FIG. 3B according to the first embodiment of the present invention.
Figure 4B:
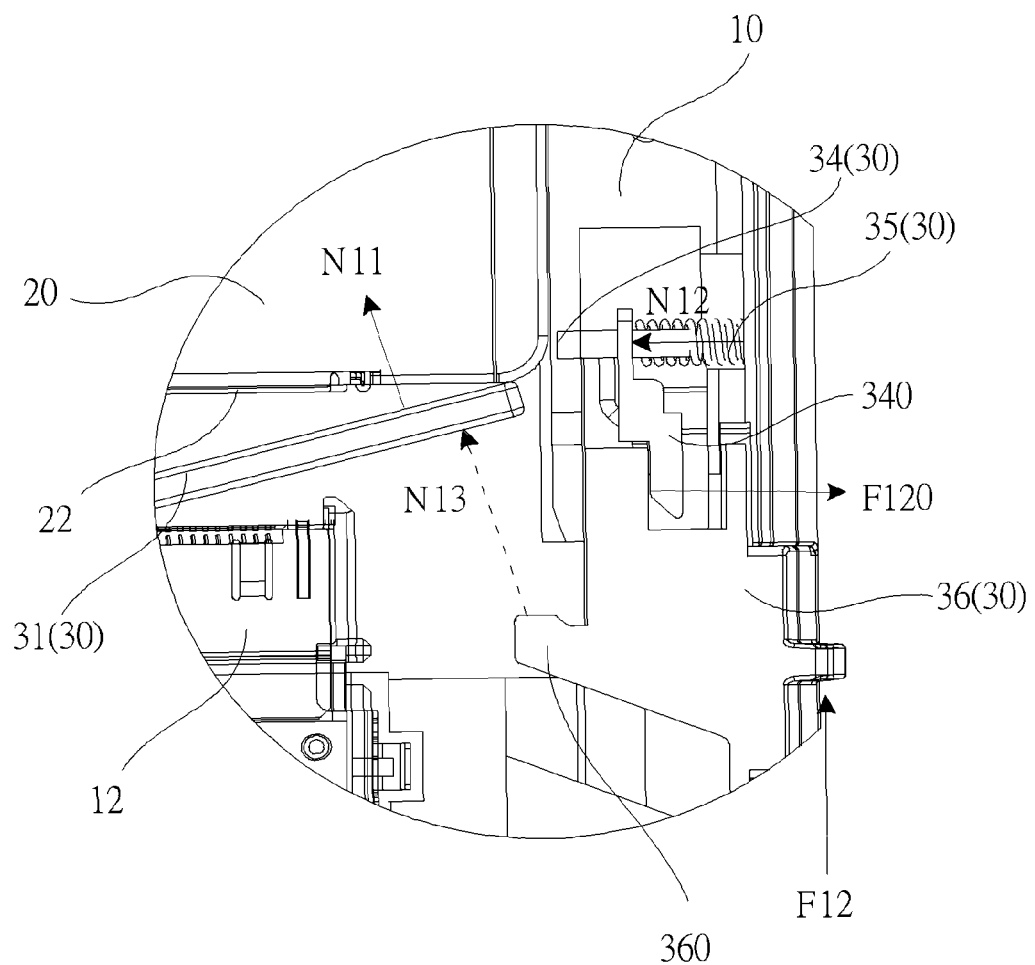

Please refer to FIG. 3A to FIG. 4B. FIG. 3A and FIG. 3B are schematic diagrams of the primary and secondary machine module 1 with an ejecting mechanism 30 according to a first embodiment of the present invention. FIG. 4A and FIG. 4B are partial enlarged diagrams respectively illustrating an A1 portion in FIG. 3A and a B1 portion in FIG. 3B according to the first embodiment of the present invention. In this embodiment, the ejecting mechanism 30 includes a bracket 31, a torsional spring 32, an engaging hole 33, an engaging rod 34, a spring 35, and a button 36.

The bracket 31 is capable of swinging back and forth between a front end and a rear end of a connecting surface of the primary connector 12. Specifically, as shown in FIG. 3A and FIG. 3B, an end of the bracket 31 can be a pivoting end and disposed at the bottom side of the slot 11 of the primary machine 10. The other end of the bracket 31 can be a free end and capable of swinging relative to a shaft 310 back and forth between the front end and the rear end of the connecting surface of the primary connector 12. Furthermore, a hollow area is formed on the bracket 31 for dodging the primary connector 12 when the bracket 31 swings. For example, a hollow area is formed on a flat middle portion of the bracket 31.

When the primary connector 12 is connected with the secondary connector 22, the bracket 31 is located at the rear end of the connecting surface of the primary connector 12, as shown in FIG. 3A. When the bracket 31 swings from the rear end toward the front end of the primary connector 12, as long as the bracket 31 applies an enough force on the secondary machine 20, it can overcome a coupling force N10 between the primary connector 12 and the secondary connector 22, so that the secondary machine 20 is pushed and ejected out of the slot 11 automatically, as shown in FIG. 3B. That is, in this embodiment, the principal action of the bracket 31 is for ejecting the secondary machine 20 in a swinging manner. Therefore, the bracket 31 is regarded as an ejecting executing portion. Furthermore, in practical applications, other structure in a swinging manner besides the bracket 31, such as a swinging rod, can be regarded as the ejecting executing portion, too.

The torsional spring 32 generates a resilient driving force N11 for driving the bracket 31 to swing toward the front end of the connecting surface of the primary connector 12. Specifically, as shown in FIG. 3A and FIG. 3B, the torsional spring 32 is sheathed on the shaft 310 of the bracket 31, and a resilient torsional force generated by the torsional spring 32 is regarded as the resilient driving force N11. The resilient driving force N11 generated by the torsional spring 32 drives the bracket 31 to swing toward the front end of the primary connector 12. Since the bracket 31 is regarded as the ejecting executing portion, and the bracket 31 swings towards the front end of the connecting surface of the primary connector 12 for ejecting the secondary machine 20, the torsional spring 32 generating the resilient driving portion N11 for the ejecting executing portion, provides a driving force for the bracket 31 to eject the secondary machine 20. Hence, the torsional spring 32 can be regarded as an ejecting driving portion.

The driving force for the bracket 31 to eject the secondary machine 20 can be composed of the resilient driving force N11 generated by the torsional spring 32 only or combination of the resilient driving force N11 and other acting forces. In this embodiment, the driving force is composed of resultant forces of the resilient driving force N11 and other acting forces. The mentioned other acting forces are described in the following paragraphs.

Furthermore, besides the torsional spring 32, other components having the driving ability in practical applications should belong to the scope of the present invention. For example, the present invention also can utilize a linear spring or a spring clip, which can generate a linear resilient force for driving the bracket 31 (i.e., the ejecting executing portion) to swing toward the front end of the connecting surface of the primary connector 12, wherein the linear resilient is regarded as the resilient driving force N11.

The engaging hole 33 moves synchronously along with the swing of the bracket 31. After the secondary machine 20 is pushed into the slot 11 of the primary machine 10 and contacts with the bracket 31, a first external force F11 overcomes the aforementioned resilient driving force N11, such that the secondary machine 20 continues to move toward an inner side of the slot 11 of the primary machine 10, and the bracket 31 is driven to gradually swing toward the rear end of the connecting surface of the primary connector 12 with the moving of the secondary machine 20. When the secondary machine 20 is pushed to a location, where the secondary connector 22 and the primary connector 12 are connected, and the bracket 31 is located at the rear end of the connecting surface of the primary connector 12 correspondingly, the engaging hole 33 moves synchronously with the swing of the bracket 31 to an end of a moving path of the engaging hole 33.

Specifically, as shown in FIG. 3A to FIG. 4B, in this embodiment, the engaging hole 33 is formed on a lateral portion of the casing 21 of the secondary machine 20. When the secondary machine 20 contacts with the bracket 31 in the slot 11 of the primary machine 10, the secondary machine 20 moves along an inner side of the lateral portion of the slot 11 and synchronously with the swing of the bracket 31. Correspondingly, the engaging hole 33 formed on the secondary machine 20 moves synchronously with the swing of the bracket 31.

When the secondary connector 22 is connected to the primary connector 12 and the bracket 31 swings to the rear end of the connecting surface of the primary connector 12, the engaging hole 33 located at the end of the moving path thereof is for locking the secondary machine 20, so as to ensure that the secondary machine 20 is combined with the primary machine 10 and operated normally rather than ejected from the primary machine 10 by mistake. Therefore, the engaging hole 33 can be regarded as an ejecting locking portion. Correspondingly, the end of the moving path of the engaging hole 33, i.e., the ejecting locking portion, can be regarded as a locking position S_lock, as shown in FIG. 3A and FIG. 4A.

Furthermore, in practical applications, the ejecting locking portion is not limited to the engaging portion 33 formed on the secondary machine 20. Other configurations and implements of the ejecting locking portion are described in the following embodiments.

The engaging rod 34 moves back and forth along a direction close to or away from the end of the moving path of the engaging hole 33, i.e., the locking position S_lock. The engaging rod 34 is inserted into and engages with the engaging hole 33 at the end of the moving path of the engaging hole 33, i.e., the locking position S_lock.

Specifically, as shown in FIG. 3A to FIG. 4B, in this embodiment, corresponding to the locking position S_lock located at the inner side of the lateral portion of the slot 11, the engaging rod 34 is disposed at an outer side of the lateral portion of the slot 11. A distance between the engaging rod 34 and the connecting surface of the primary connector 12 is substantially equal to a distance between the engaging hole 33 located at the locking position and a connecting surface of the secondary connector 22.

When the secondary connector 22 is connected to the primary connector 12, the connecting surface of the secondary connector 22 contacts with the connecting surface of the primary connector 12, and the engaging hole 33 formed on the secondary machine 20 is located at the end of the moving path thereof, i.e., the locking position S_lock. At this moment, an end of the engaging rod 34 is aligned with an opening of the engaging hole 33 located at the locking position. As long as the engaging rod 34 moves along the direction close to the locking position, the engaging rod 34 can be inserted into and engage with the engaging hole 33, as shown in FIG. 3A and FIG. 4A. Furthermore, when the engaging rod 34 engages with the engaging hole 33, the secondary machine 20 where the engaging hole 33 is formed, is locked and restrained by the engaging rod 34, and the secondary machine 20 applies a locking restraining force N_lock on the bracket 31. Meanwhile, as shown in FIG. 3A and FIG. 4A, the resilient driving force N11 generated by the torsional spring 32 is suppressed by the transmitted locking restraining force N_lock, i.e., a resultant force of the locking restraining force N_lock and the coupling force N10 is greater than the resilient driving force N11, such that the bracket 31 is locked at a current position and not capable of ejecting the secondary machine 20 out of the slot 11. Therefore, the engaging rod 34 locks the bracket 31 and prevents the bracket 31 from ejecting the secondary machine 20 by engaging with the engaging hole 33.

On the other hand, when the engaging rod 34 moves along the direction away from the locking position S_lock, the engaging rod 34 moves out of the engaging hole 33, such that the locking restraining force N_lock is eliminated, which releases the secondary machine 20 from locking. As shown in FIG. 3B and FIG. 4B, the bracket 31 swings toward the front end of the connecting surface of the primary connector 12 by the resilient driving force N11 generated by the torsional spring 32, so as to overcome the coupling force N10 between the primary connector 12 and the secondary connector 22 to eject the secondary machine 20 out of the slot 11 automatically.

Based on the above-mentioned description of the engaging rod 34, the principal action of the engaging rod 34 is for locking the secondary machine 20. Therefore, the engaging rod 34 is regarded as a locking executing portion.

Furthermore, in practical applications with different configurations and implements of the ejecting locking portion, a location of the locking executing portion can be adjusted accordingly, and the locking executing portion is not limited to the engaging rod 34. Detailed description is described in the following embodiments.

The spring 35, such as a linear spring, generates a resilient retaining force N12 to drive the engaging rod 34 to move close to the end of the moving path of the engaging hole 33, i.e., the locking position S_lock.

Specifically, as shown in FIG. 3A to FIG. 4B, the spring 35 is disposed at a side of the engaging rod 34 back on the locking position S_lock, so as to provide the engaging rod 34 with a linear resilient force, i.e., the resilient retaining force N12. As mentioned above, the engaging rod 34 can be inserted into the engaging hole 33 when being close to the locking position S_lock of the engaging hole 33, which locks the secondary machine 20. Therefore, the spring 35 biases the engaging rod 34 to move close to the locking position S_lock of the engaging hole 33, and the engaging rod 34 keeps locking the secondary machine 20. Hence, the spring 35 is regarded as a locking retaining portion. Furthermore, besides the spring 35, other component, such as a spring clip, having the driving ability in practical applications should belong to the scope of the present invention.

The button 36 drives the engaging rod 34 to move away from the locking position S_lock by a second external force F12 overcoming the resilient retaining force N12. Furthermore, the button 36 contacts with the bracket 31 swinging to the rear end of the connecting surface of the primary connector 12 by the second external force F12 and generates an auxiliary pushing force N13 in the same direction as aforementioned resilient driving force N11 for the bracket 31, which satisfies a situation that the driving force for the bracket 31 is composed of the resilient driving force N11 and other acting force, as mentioned above.

The resilient driving force N11 and the auxiliary pushing force N13 can provide the bracket 31 with enough force, so as to overcome the coupling force N10 between the primary connector 12 and the secondary connector 22 to eject the secondary machine 20 out of the slot 11. That is, a resultant force of the resilient driving force N11 and the auxiliary pushing force N13 is larger than the coupling force between the secondary connector 22 and the primary connector 12.

Specifically, as shown in FIG. 3A to FIG. 4B, the button 36 is disposed at the outer side of the lateral portion of the slot 11, and the button 36 is closer to the bottom side of the slot 11 than the engaging rod 34 is to the bottom side of the slot 11. Furthermore, the button 36 is partially exposed out of the primary machine 10. A part of the button 36 exposed out of the primary machine 10 is for receiving the aforementioned second external force F12, as shown in FIG. 3B and FIG. 4B. When receiving the second external force F12, the button 36 slides along a direction parallel to the lateral portion of the slot 11. Correspondingly, the engaging rod 34 is further connected with a base 340. The base 340 has an inclined surface contacting with the button 36. When the button 36 slides in a manner as mentioned above, the button 36 is linked with a locking executing portion including the engaging rod 34 and the base 340 by cooperating with the inclined surface of the base 340. A component force F120 on the base 340 generated by the second external force F12 overcomes the resilient retaining force N12, such that the engaging rod 34 is linked to slide along the direction away from the locking position S_lock.

Additionally, the button 36 further has a protruding block 360 for contacting with bracket 31. When the button 36 slides along the lateral portion of the slot 11, the protruding block 360 is able to contact with the bracket 31 and generate the aforementioned auxiliary pushing force N13 for driving the bracket 31 to swing toward the front end of the connecting surface of the primary connector 12.

It should be noted that the auxiliary pushing force N13 is generated when the protruding block 360 contacts with the bracket 31, but the protruding block 360 and the bracket 31 are separated, as shown in FIG. 3B and FIG. 4B. Therefore, the auxiliary pushing force N13 is illustrated by a dash arrow from the protruding block 360 to the bracket 31, so as to indicate that the auxiliary pushing force N13 drives the bracket 31 to swing toward the front end of the connecting surface of the primary connector 12.

As mentioned above, when the engaging rod 34 is away from the locking position S_lock, locking of the secondary machine 20 is released. Therefore, the button 36 drives the engaging rod 34 to move away from the locking position S_lock by the second external force F12, and the principal action of the button 36 is for releasing. The button 36 is regarded as a releasing driving portion.

Furthermore, in practical applications, the releasing driving portion is not limited to the button 36. For example, the auxiliary pushing force N13 generated by the button 36 is not necessary as the torsional spring 32 generates the enough resilient driving force N11 to provide the driving force for the bracket 31 to eject the secondary machine 20. Other configurations and implements are described in the following embodiments.

In addition to the above-mentioned structure, in this embodiment, the ejecting mechanism 30 can further include a pair of magnets 37, 38 disposed on the lateral portion of the slot 11 of the primary machine 10 and the lateral portion of the casing 21 of the secondary machine 20, respectively. In a longitudinal direction of the slot 11, a distance between the magnet 37 disposed on the slot 11 and the connecting surface of the primary connector 12 is larger than a distance between the magnet 38 disposed on the secondary machine 20 and the connecting surface of the secondary machine 20. When the secondary machine 20 is ejected out of the slot 11, the pair of the magnets 37, 38 disposed on the slot 11 and the secondary machine 20 can generate a magnetic force for absorbing a momentum of the ejected secondary machine 20, which prevents the secondary machine 20 from falling down and crashing after ejecting out of the slot 11 rapidly. Therefore, the magnets 37, 38 providing a buffering effect for the secondary machine 20 are regarded as ejecting buffering portions. In practical applications, the ejecting buffering portion can be replaced by other component capable of generating an attracting force.

Figure 5A:
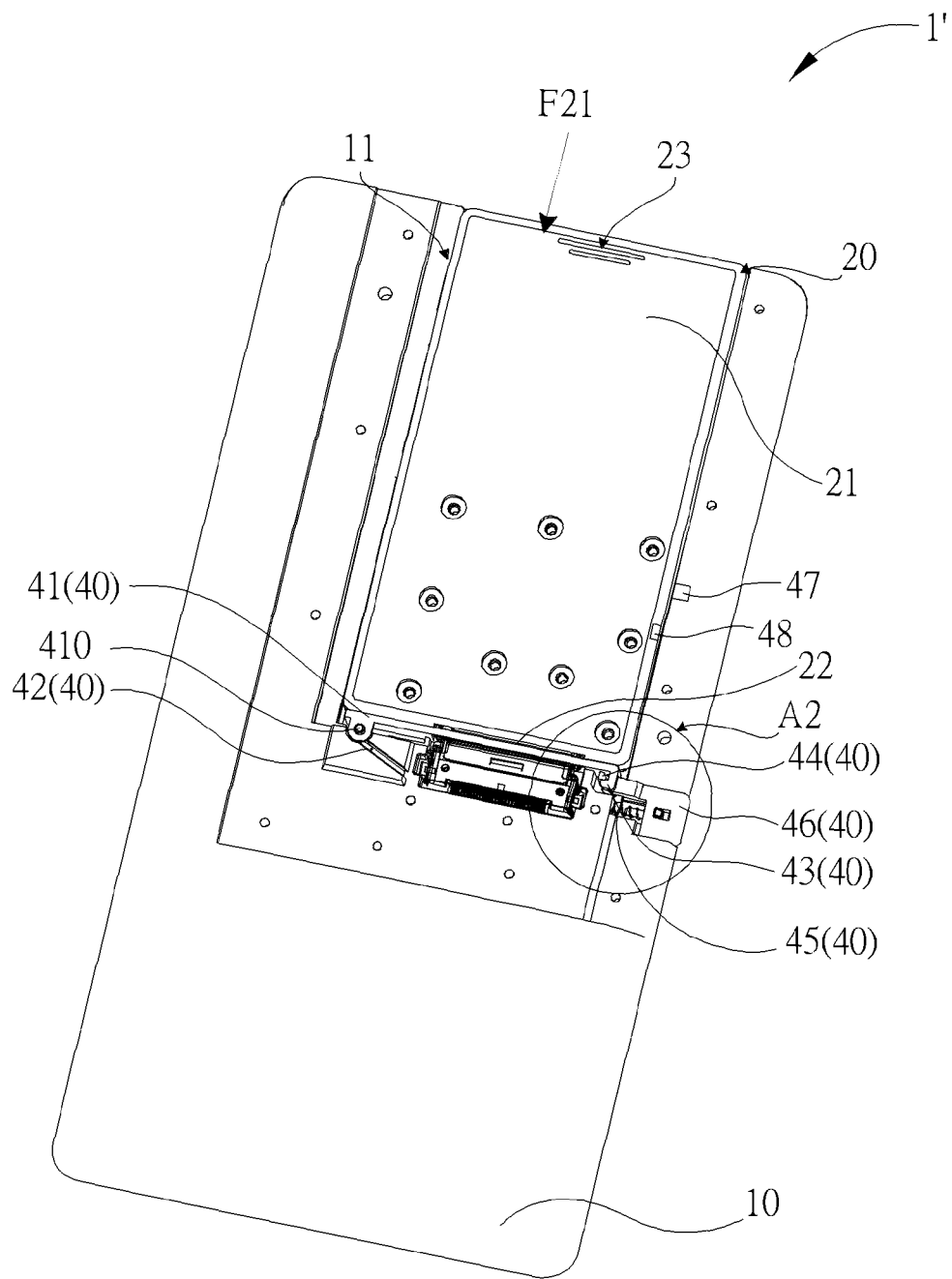
FIG. 5A and FIG. 5B are schematic diagrams of a primary and secondary machine module with an ejecting mechanism according to a second embodiment of the present invention.
Figure 5B:
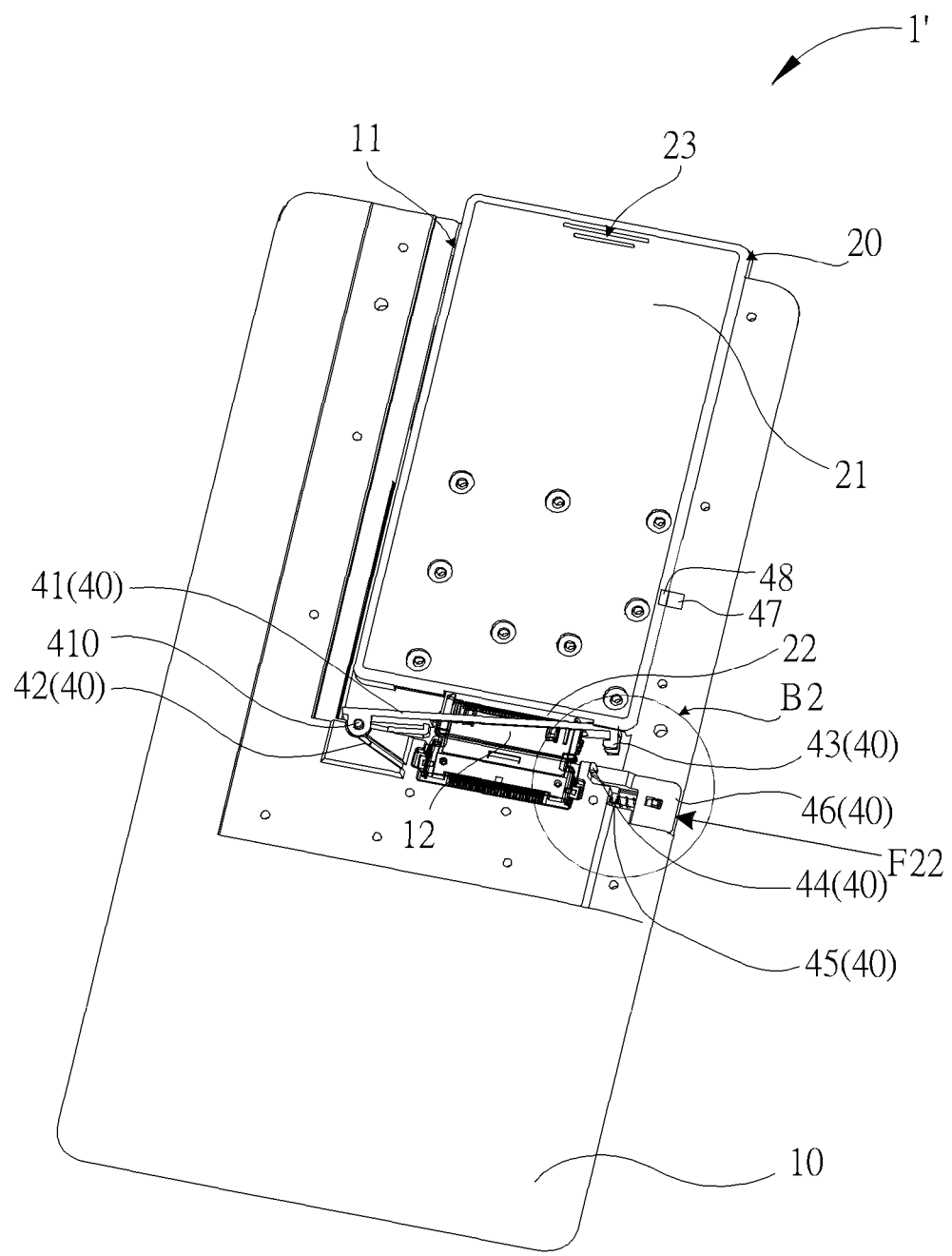

Please refer to FIG. 5A and FIG. 5B. FIG. 5A and FIG. 5B are schematic diagrams of a primary and secondary machine module 1' with an ejecting mechanism 40 according to a second embodiment of the present invention. In this embodiment, the present invention provides the ejecting mechanism 40 adapted for the primary machine 10 and secondary machine 20.

Figure 6A:
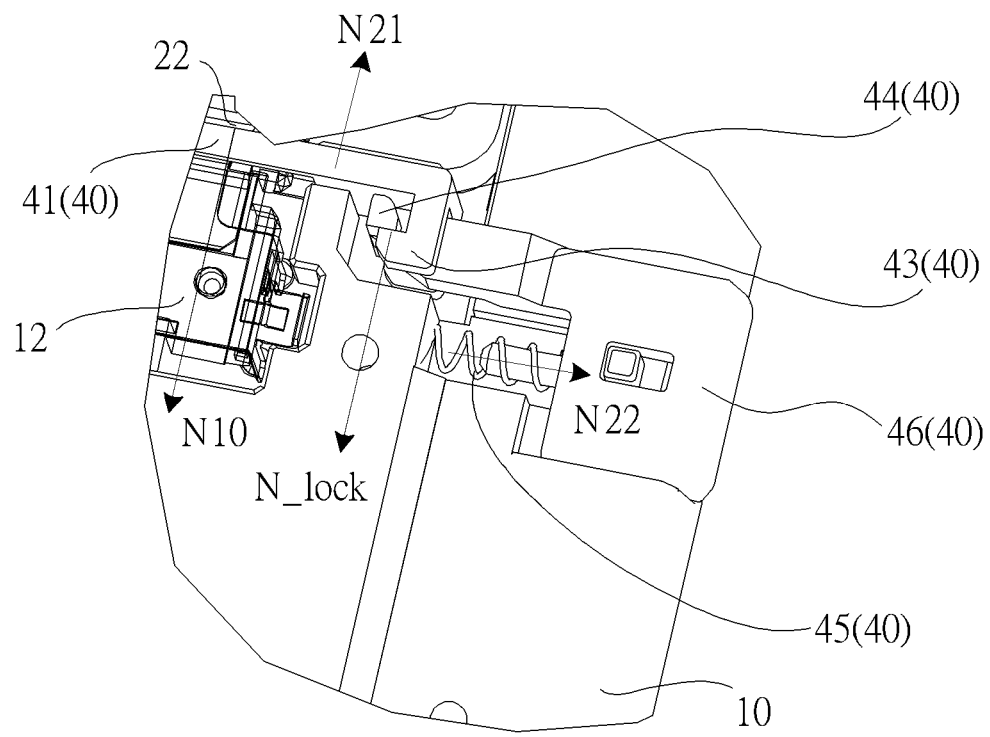
FIG. 6A and FIG. 6B are partial enlarged diagrams respectively illustrating an A2 portion in FIG. 5A and a B2 portion in FIG. 5B according to the second embodiment of the present invention.
Figure 6B:
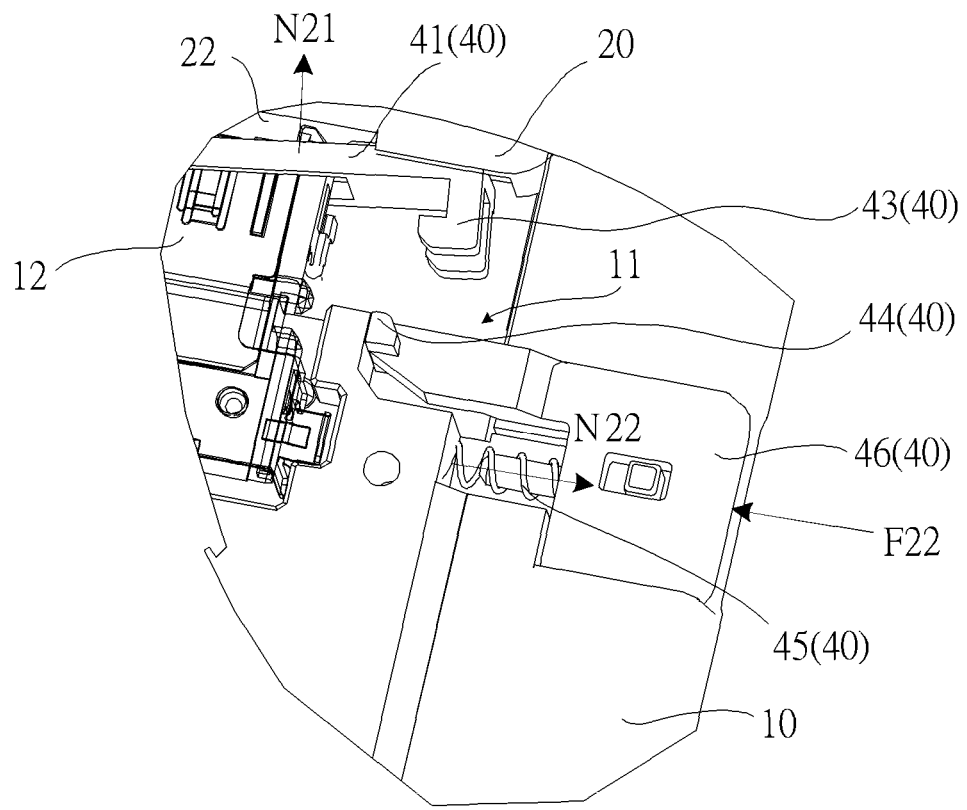

Please refer to FIG. 5A to FIG. 6B. FIG. 6A and FIG. 6B are partial enlarged diagrams respectively illustrating an A2 portion in FIG. 5A and a B2 portion in FIG. 5B according to the second embodiment of the present invention. In this embodiment, the ejecting mechanism 40 includes a bracket 41, a torsional spring 42, an engaging hook 43, an engaging block 44, a spring 45, and a pushing button 46.

In this embodiment, the bracket 41 and the torsional spring 42 are respectively regarded as the ejecting executing portion and the ejecting driving portion, and functions of the bracket 41 and the torsional spring 42 are similar to functions of the bracket 31 and the torsional spring 32 of the first embodiment. The detailed description is omitted herein for simplicity. However, the engaging hole 33, the engaging rod 34, the spring 35, and the button 36 of the first embodiment are respectively replaced by the engaging hook 43, the engaging block 44, the spring 45, and the pushing button 46 of the second embodiment. In this embodiment, the engaging hook 43, the engaging block 44, the spring 45, and the pushing button 46 are regarded as the ejecting locking portion, the locking executing portion, the locking retaining portion, and releasing driving portion. The detailed description is described as follows.

As shown in FIG. 5A to FIG. 6B, in this embodiment, the engaging hook 43 regarded as the ejecting locking portion, is formed at a free end of the bracket 41 and capable of swinging relative to a shaft 410 disposed at a pivoting end of the bracket 41.

When a first external force F21 overcomes a resilient driving force N21 generated by the torsional spring 42, so as to push the secondary machine 20 contacting with the bracket 41 into the slot 11 of the primary machine 10 and to drive the bracket 41 to gradually swing toward the rear end of the primary connector 12, the engaging hook 43 swings to the locking position S_lock with the free end of the bracket 41. In this embodiment, in the longitudinal direction of the slot 11, the locking position S_lock is located at the rear end of the connecting surface of the primary connector 12. In a transverse direction, the locking position S_lock is located at the inner side of the lateral portion of the slot 11.

As shown in FIG. 5A to FIG. 6B, the engaging block 44 regarded as the locking executing portion and the pushing button 46 regarded as the releasing driving portion are integrally formed. In the longitudinal direction of the slot 11, the engaging block 44 and the pushing button 46 integrally formed are located at the rear end of the connecting surface of the primary connector 12. In a transverse direction, the engaging block 44 is closer to the inner side of the slot 11 than the locking position S_lock is to the inner side of the slot 11, the button 46 is closer to the outer side of the slot 11 than the locking position S_lock is to the inner side of the slot 11, and a part of the button 46 is exposed out of the primary machine 11.

In this embodiment, since the engaging block 44 and the pushing button 46 are integrally formed and slide in an identical direction, the spring 45, which is regarded as the resilient retaining portion, can directly apply a resilient retaining force N22 on the pushing button 46, and the resilient retaining force N22 is transmitted to the engaging block 44 via the pushing button 46. Furthermore, the spring 45 is disposed at a side of the pushing button 46 close to the inner side of the slot 11 for generating the resilient retaining force N22 toward the outer side of the slot 11, such that the engaging block 44 is driven to move toward the outer side of the slot 11 and close to the locking position S_lock.

When the resilient retaining force N22 generated by the spring 45 drives the engaging block 44 to move from a position near the inner side of the slot 11 to a position near the outer side of the slot 11 and close to the locking position S_lock, the engaging hook 43 driven to be located the locking position S_lock with the swinging bracket 41 can engage with the engaging block 44, such that the engaging block 44 applies the locking restraining force N_lock on the bracket 41 via the engaging hook 43, which locks the secondary machine 20, as shown in FIG. 5A and FIG. 6A.

When the pushing button 46 is pressed by a second external force F22 which is toward the inner side of the slot 11 and capable of overcoming the resilient retaining force N22, so as to slide toward the inner side of the slot 11, the engaging block 44 sliding with the pushing button 46 moves along a direction close to the inner side of the slot 11 and away from the locking position S_lock. Therefore, the engaging block 44 disengages from the engaging hook 43, such that the locking retraining force N_lock applied on the bracket 41 is released, which releases the secondary machine 20 from locking.

Furthermore, the pushing button 46 does not generate the auxiliary pushing force N13 mentioned in the first embodiment for the bracket 41. Therefore, in this embodiment, the torsional spring 42 can generate the enough resilient driving force N21 to provide the bracket 41 with an acting force for overcoming the coupling force N10 between the primary connector 12 and the secondary connector 22 and pushing the secondary machine 20 out of the slot 11, i.e., the resilient driving force N21 is larger than the coupling force N10 between the secondary connector 22 and the primary connector 12.

In addition to the aforementioned structure, similar to the first embodiment, the ejecting mechanism 40 of the second embodiment can further include a pair of the magnets 47, 48 regarded as the ejecting buffering portion and disposed at the lateral portion of the slot 11 of the primary machine 10 and the lateral portion of the casing 21 of the secondary machine 20.

Furthermore, in this embodiment, a holding portion 23 can be further formed on a top portion of the casing 21 of the secondary machine 20 for a hand holding purpose. The holding portion 23 can be a plurality of beam protrusions.

Figure 7A:
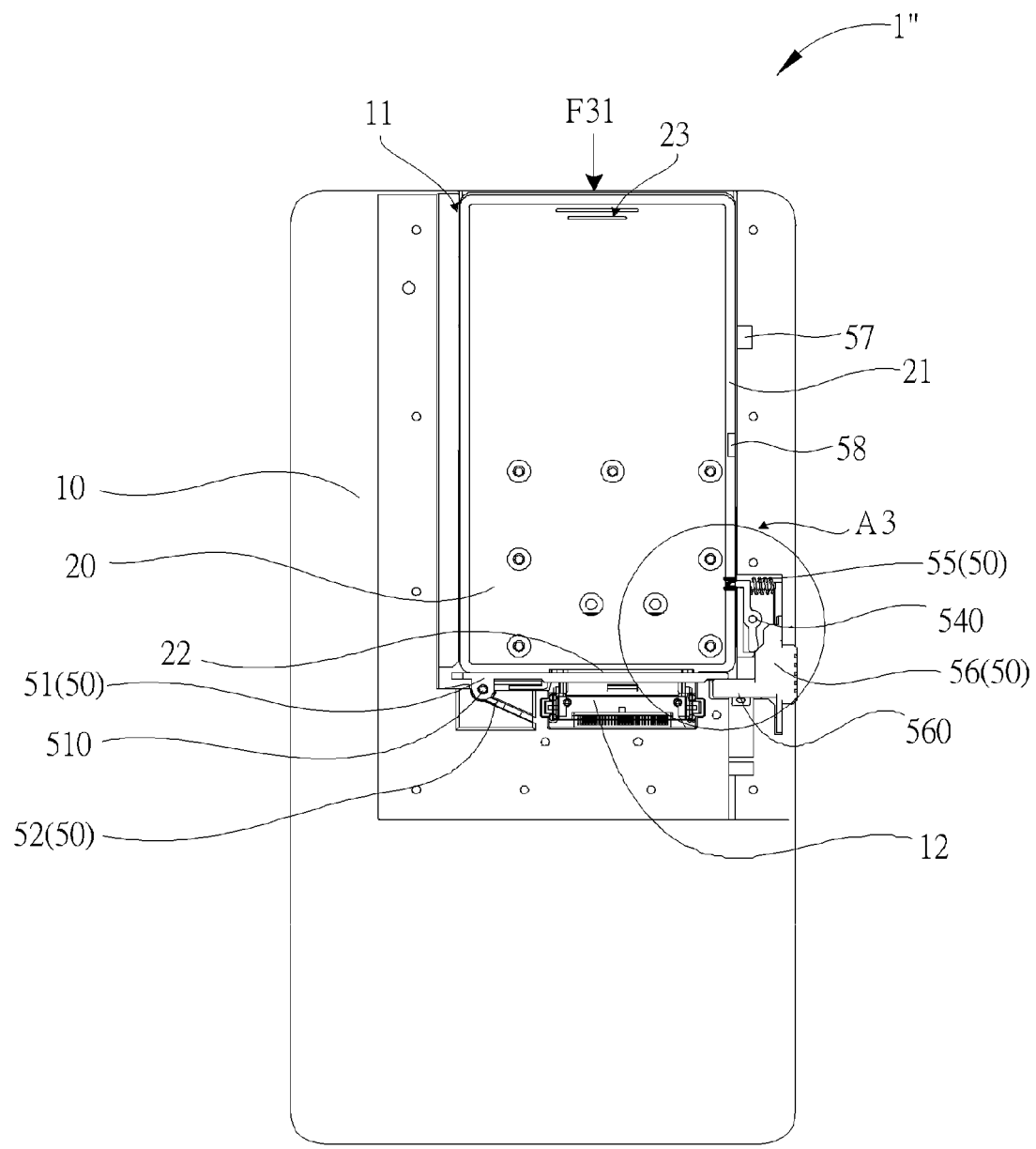
FIG. 7A and FIG. 7B are schematic diagrams of a primary and secondary machine module with an ejecting mechanism according to a third embodiment of the present invention.
Figure 7B:
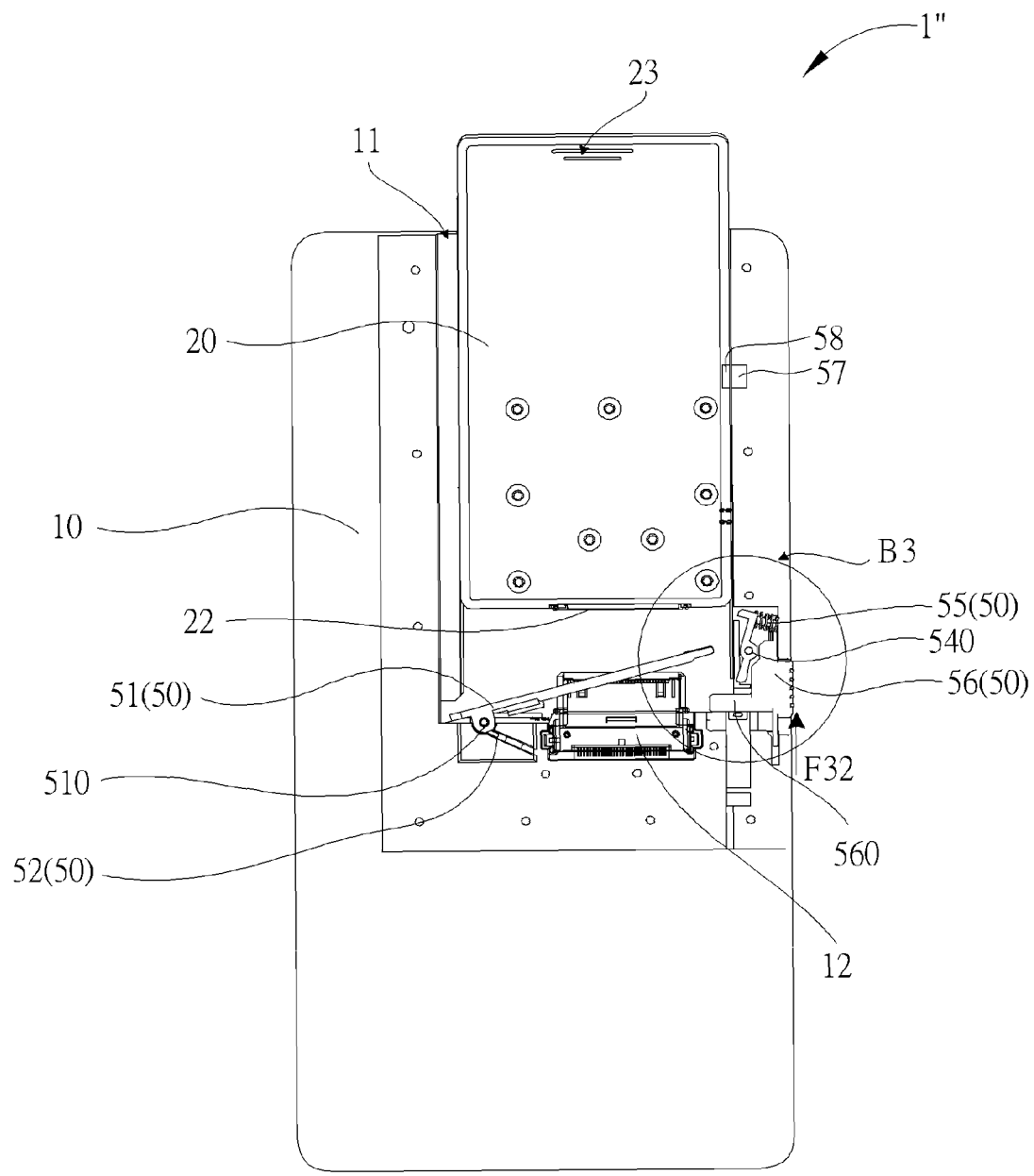

Please refer to FIG. 7A and FIG. 7B. FIG. 7A and FIG. 7B are schematic diagrams of a primary and secondary machine module 1" with an ejecting mechanism 50 according to a third embodiment of the present invention. In this embodiment, the present invention provides the ejecting mechanism 50 different from the aforementioned ejecting mechanisms 30, 40 of the first embodiment and the second embodiment. The ejecting mechanism 50 is also adapted for the primary machine 10 and the secondary machine 20.

Figure 8A:
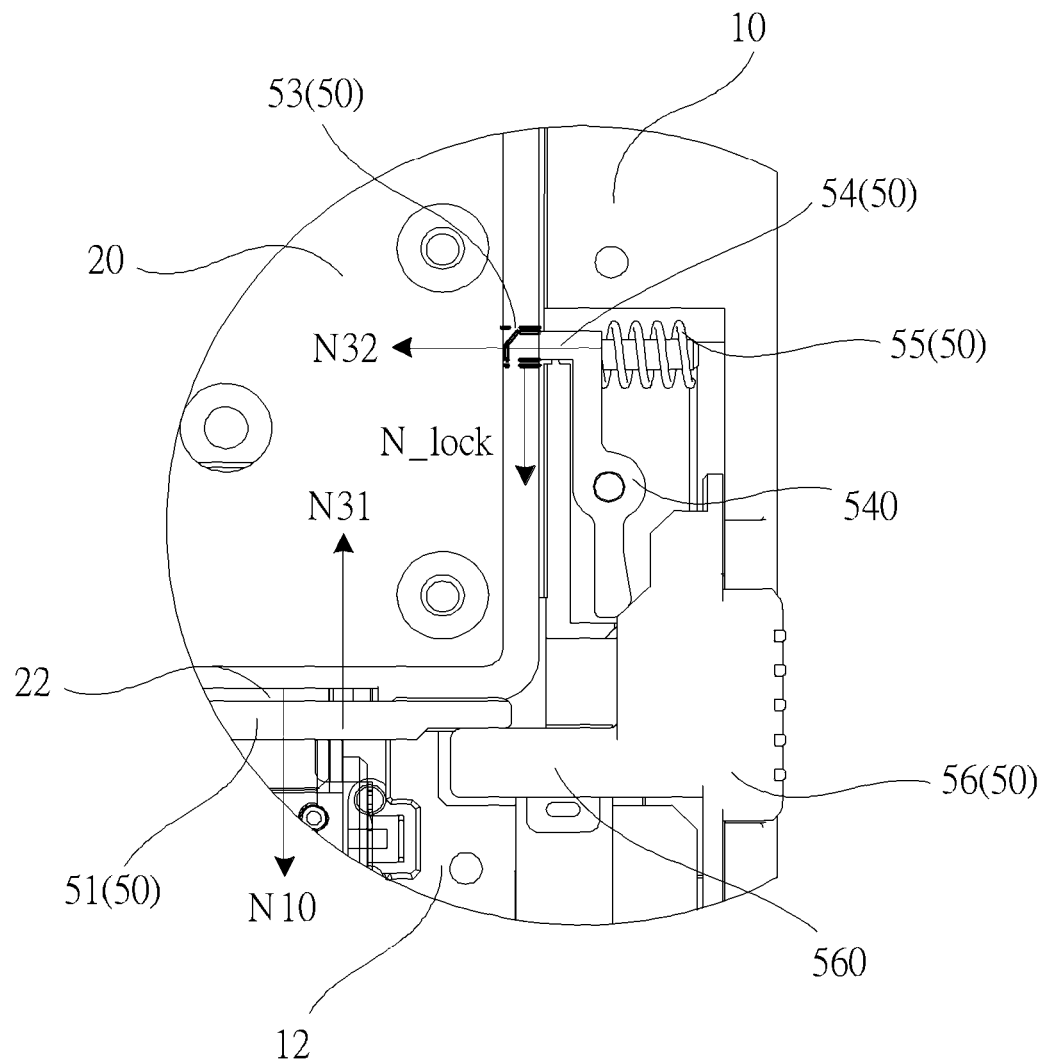
FIG. 8A and FIG. 8B are partial enlarged diagrams respectively illustrating an A3 portion in FIG. 7A and a B3 portion in FIG. 7B according to the third embodiment of the present invention.
Figure 8B:
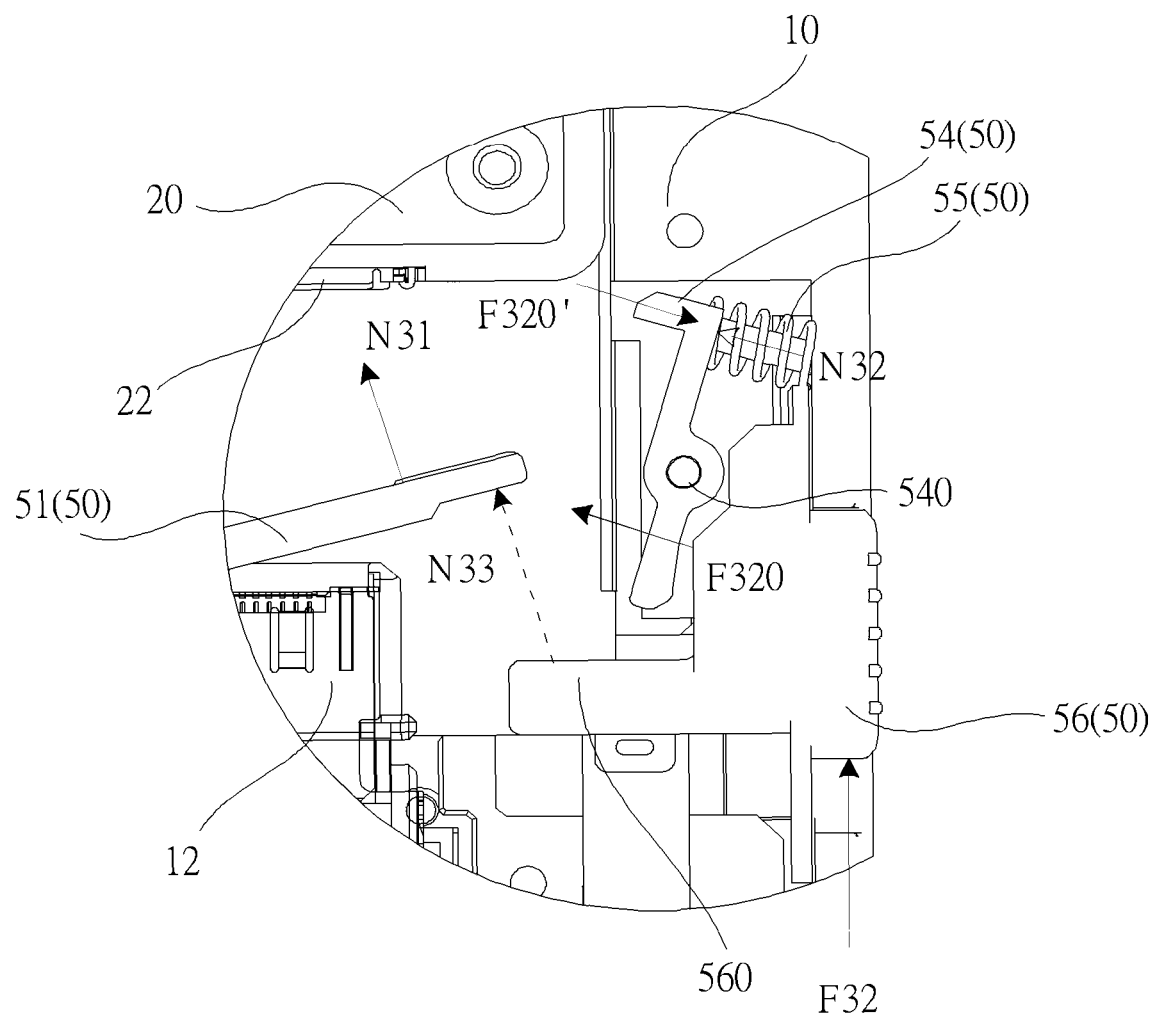

Please refer to FIG. 7A to FIG. 8B. FIG. 8A and FIG. 8B are partial enlarged diagrams respectively illustrating an A3 portion in FIG. 7A and a B3 portion in FIG. 7B according to the third embodiment of the present invention. The ejecting mechanism 50 includes a bracket 51, a torsional spring 52, an engaging hole 53, an engaging rod 54, a spring 55, and a button 56.

The bracket 51, the torsional spring 52, the engaging hole 53, and the spring 55 are respectively regarded as the ejecting executing portion, the ejecting driving portion, the ejecting locking portion, and the locking retaining portion. Functions of the bracket 51, the torsional spring 52, the engaging hole 53, and the spring 55 are similar to the functions of the bracket 31, the torsional spring 32, the engaging hole 33, and the spring 35 of the first embodiment. The detailed description is omitted herein for simplicity.

Furthermore, the engaging rod 54 and the button 56 are respectively regarded as the locking executing portion and the releasing driving portion. Functions of the engaging rod 54 and the button 56 are similar to functions of the engaging rod 34 and the button 36. However, the linking mechanism of the engaging rod 54 and the button 56 is different from the linking mechanism of the engaging rod 34 and the button 36. The detail description is as follows.

As shown in FIG. 7A to FIG. 8B, a swinging rod 540 is rotatably disposed at the outer side of the lateral portion of the slot 11. The engaging rod 54 regarded as the ejecting locking portion is located at an end of the swinging rod 540, so as to swing relative to a shaft of the swinging rod 540 back and forth along the direction close to or away from the locking position S_lock.

When a first external force F31 overcomes a resilient driving force N31 generated by the torsional spring 52, so as to push the secondary machine 20 contacting with the bracket 51 into the slot 11 of the primary machine 10 and to drive the bracket 51 pushed by the secondary machine 20 to gradually swing to the rear end of the connecting surface of the primary connector 12, the engaging hole 53 moves to the locking position S_lock with the secondary machine 20. Meanwhile, the engaging rod 54 near the locking position S_lock can be inserted into the engaging hole 53 and apply the locking restraining force N_lock on the bracket 51 via the secondary machine 20 where the engaging hole 53 is formed.

Meanwhile, the resilient driving force N31 generated by the torsional spring 52 is suppressed by the transmitted locking restraining force N_lock, i.e., a resultant force of the locking restraining force N_lock and the coupling force N10 is larger than the resilient driving force N31, such that the bracket 51 is locked at a current position, and the secondary machine 20 cannot be ejected out of the slot 11. Therefore, the engaging rod 54 locks the bracket 51 and prevents the bracket 51 from ejecting the secondary machine 20 by engaging with the engaging hole 53. Correspondingly, the spring 55 is disposed at a side of the engaging rod 54 opposite to the locking position S_lock, so as to generate a linear resilient force for the engaging rod 54. The linear resilient force is regarded as the resilient retaining force for driving the engaging rod 54 to keep close to the locking position S_lock.

As shown in FIG. 7A to FIG. 8B, the button 56 regarded as the releasing driving portion contacts with the other end of the swinging 540. Since the button 56 can slide along the direction parallel to the lateral portion of the slot 11, the engaging rod 54 is driven by the button 56 to rotate relative to the swinging rod 540.

When the button 56 is driven to slide along the direction parallel to the lateral portion of the slot 11 by the second external force F32, the button 56 contacts with the other end of the swinging rod 540. A component force F320 is formed on the other end of the swinging rod 540 by the second external force F32. The component force F320 drives the other end of the swinging rod 540 to swing along the direction close to the inner side of the slot 11. Correspondingly, swing of the other end of the swinging rod 54 causes an equivalent force F320' formed on the end of the swinging rod 540 where the engaging rod 54 is located. The equivalent force F320' drives the end of the swinging rod 540 where the engaging rod 54 is located to overcome the resilient retaining force N32 and to swing toward the outer side of the slot 11, such that the engaging rod 54 moves away from the locking position S_lock of the engaging hole 53 located at the inner side of the lateral portion of the slot 11, which drives the engaging rod 54 to disengage from the engaging hole 53 and eliminate the locking restraining force N_lock applied on the bracket 51 for releasing the secondary machine 20 from locking.

Similar to the button 36 of the first embodiment, the button 56 of this embodiment also has a protruding block 560. When the button 56 slides along the direction parallel to the lateral portion of the slot 11, the protruding block 560 can contact with the bracket 51 and generate an auxiliary pushing force N33 for driving the bracket 51 to swing to rotate relative to a shaft 510 toward the front end of the connecting surface of the primary connector 12. A resultant force of the resilient driving force N31 and the auxiliary pushing force N33 provides enough acting force for overcoming the coupling force N10 between the primary connecter 12 and the secondary connector 22 and pushing the secondary machine 20 to eject out of the slot 11, i.e., the resultant force of the resilient driving force N31 and the auxiliary pushing force N33 is larger than the coupling force N10 between the secondary connector 22 and the primary connector 12.

Similar to the first embodiment, the auxiliary pushing force N33 is generated when the protruding block 560 contacts with the bracket 51. However, the protruding block 560 and the bracket 51 are separated, as shown in FIG. 7B and FIG. 8B. Therefore, the auxiliary pushing force N33 is illustrated by a dash arrow from the protruding block 560 to the bracket 51 in FIG. 8B for indicating that the auxiliary pushing force N33 drives the bracket 51 to swing toward the front end of the connecting surface of the primary connector 12.

In addition to the structure mentioned above, similar to the first embodiment, the ejecting mechanism 50 can further include a pair of magnets 57, 58 disposed on the lateral portion of the slot 11 of the primary machine 10 and the lateral portion of the casing 21 of the secondary machine 20, respectively. The magnets 57, 58 are regarded as the ejecting buffering portions.

Furthermore, in this embodiment, a hand holding portion 23 is further formed on the top portion of the casing 21 of the secondary machine 20 for a hand holding purpose. The hand holding portion 23 can be a plurality of beam protrusions.

Compared to the prior art, the ejecting mechanism of the present invention provides the ejecting executing portion, which is driven by the ejecting driving portion, for pushing the secondary machine out of the primary machine and for separating the secondary connector and the primary connector which are connected to each other. It allows the secondary machine to be ejected out of the primary machine automatically and prevents damage of the secondary connector and the primary connector caused by applying an external pulling force on the secondary machine directly. Furthermore, when the first external force overcomes the resilient driving force to push the secondary machine into the slot such that the secondary connector is connected to the primary connector, the ejecting executing portion contacting with the secondary machine swings to the rear end of the connecting surface of the primary connector. Additionally, the ejecting locking portion moving with the swing of the ejecting executing portion can be locked by the locking executing portion, such that the automatic ejection of the secondary machine is restrained.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ejecting mechanism for a primary and secondary machine module, a primary machine of the primary and secondary machine module having a slot whereinto a secondary machine of the primary and secondary machine module is inserted, a primary connector being disposed at a bottom side of the slot, a secondary connector being disposed at a bottom side of the secondary machine for connecting with the primary connector, and the ejecting mechanism comprising:

an ejecting executing portion swinging back and forth between a front end and a rear end of a connecting surface of the primary connector;

an ejecting driving portion sheathed on a shaft of the ejecting executing portion and for generating a resilient driving force to swing the ejecting executing portion toward the front end of the connecting surface of the primary connector;

an ejecting locking portion moving synchronously along with swing of the ejecting driving portion, wherein when a first external force overcomes the resilient driving force to push the secondary machine into the slot, so as to connect the secondary connector with the primary connector, the ejecting executing portion contacting with the secondary machine swings to the rear end of the connecting surface of the primary connector, such that the ejecting locking portion is located at a locking position;

a locking executing portion moving back and forth along a direction close to or away from the locking position, and the locking executing portion engaging with the ejecting locking portion at the locking position;

a locking retaining portion for generating a resilient retaining force to retain the locking executing portion close to the locking position; and a releasing driving portion for driving the locking executing portion to move away from the locking position under a second external force overcoming the resilient retaining force, the releasing driving portion driven by the second external force further generating an auxiliary pushing force along a direction of the resilient driving force for the ejecting executing portion swinging to the rear end of the connecting surface of the primary machine, and a resultant force of the resilient driving force and the auxiliary pushing force being larger than a coupling force between the secondary connector and the primary connector.

2. The ejecting mechanism of claim 1, wherein the ejecting locking portion is formed on the ejecting executing portion or the secondary machine.

3. The ejecting mechanism of claim 1, wherein the resilient driving force is larger than a coupling force between the secondary connector and the primary connector.

4. The ejecting mechanism of claim 3, wherein the ejecting executing portion is a flat structure, a hollow area is formed on a middle portion of the flat structure for dodging the primary connector when the flat structure swings, the ejecting driving portion is a torsional spring installed on a shaft of the ejecting executing portion, the ejecting locking portion comprises a engaging hook formed on the ejecting executing portion, the locking executing portion comprises an engaging block cooperating with the engaging hook, the releasing driving portion and a second hook are integrally formed, and the locking retaining portion is a linear spring for pushing the locking executing portion formed with the second hook.

5. The ejecting mechanism of claim 1, wherein a hollow area is formed on the ejecting executing portion for dodging the primary connector when the ejecting executing portion swings.

6. The ejecting mechanism of claim 5, wherein the ejecting executing portion is a flat structure, and the hollow area is formed on a middle portion of the flat structure.

7. The ejecting mechanism of claim 1, wherein the ejecting driving portion is a torsional spring, and the resilient driving force is a torsional force applying on the shaft of the ejecting executing portion.

8. The ejecting mechanism of claim 1, wherein the ejecting locking portion comprises an engaging hook and the locking executing portion comprises an engaging block, or the ejecting locking portion comprises an engaging hole and the locking executing portion comprises an engaging rod for inserting into the engaging hole.

9. The ejecting mechanism of claim 1, wherein the resilient retaining force is a linear force.

10. The ejecting mechanism of claim 9, wherein the locking retaining portion is a linear spring.

11. The ejecting mechanism of claim 1, wherein the locking executing portion and the releasing driving portion are linked with each other in a sliding manner along different directions, or in a sliding manner along a same direction, or in a manner of conversion of rotation and sliding.

12. The ejecting mechanism of claim 11, wherein the locking executing portion and the releasing driving portion are linked with each other in the sliding manner by an inclined surface, or in a manner of integral formation of the locking executing portion and the releasing driving portion, or in a manner that the releasing driving portion drives the locking executing portion to rotate by sliding.

13. The ejecting mechanism of claim 1, further comprising:

an ejecting buffering portion for generating an attracting force between the slot and the secondary machine disengaging from the primary connector.

14. The ejecting mechanism of claim 13, wherein the ejecting buffering portion comprises a pair of magnets respectively installed on the slot and the secondary machine, and a distance between the magnet installed on the slot and the primary connector is greater than a distance between the magnet installed on the secondary machine and a connecting port of the secondary connector.

15. The ejecting mechanism of claim 1, wherein the ejecting executing portion is a flat structure, a hollow area is formed on a middle portion of the flat structure, the ejecting driving portion is a torsional spring installed on a shaft of the ejecting executing portion, the ejecting locking portion comprises an engaging hole formed on the secondary machine, the locking executing portion comprises an engaging block and an engaging rod formed on the engaging block for engaging with the engaging hole, the locking retaining portion is a linear spring for pushing the engaging block to slide, and the releasing driving portion and the engaging block are linked with each other in a sliding manner along different directions by an inclined surface.

16. The ejecting mechanism of claim 1, wherein the ejecting executing portion is a flat structure, a hollow area is formed on a middle portion of the flat structure for dodging the primary connector when the flat structure swings, the ejecting driving portion is a torsional spring installed on a shaft of the ejecting executing portion, the ejecting locking portion comprises an engaging hole formed on the secondary machine, the locking executing portion comprises a swinging rod and an engaging rod formed on an end of the swinging rod and cooperating with the engaging hole, the releasing retaining portion is a linear spring located at the end of the swinging rod and pushes the engaging rod to rotate around a shaft of the swinging rod, and the releasing driving portion contacts with the other end of the swinging arm, so as to slide and be linked with the swinging arm by pushing the engaging rod to rotate around the shaft of the swinging rod.

17. A primary machine applied for accommodating a secondary machine, comprising:

a slot whereinto the secondary machine is inserted;

a primary connector installed at the bottom side of the slot for connecting with the secondary machine; and an ejecting mechanism, the ejecting mechanism comprising:

an ejecting executing portion swinging back and forth between a front end and a rear end of a connecting surface of the primary connector;

an ejecting driving portion sheathed on a shaft of the ejecting executing portion and for generating a resilient driving force to swing the ejecting executing portion toward the front end of the connecting surface of the primary connector;

an ejecting locking portion moving synchronously along with swing of the ejecting driving portion, wherein when a first external force overcomes the resilient driving force to push the secondary machine into the slot, so as to connect a secondary connector with the primary connector, the ejecting executing portion contacting with the secondary machine swings to the rear end of the connecting surface of the primary connector, such that the ejecting locking portion is located at a locking position;

a locking executing portion moving back and forth along a direction close to or away from the locking position, and the locking executing portion engaging with the ejecting locking portion at the locking position;

a locking retaining portion for generating a resilient retaining force to retain the locking executing portion close to the locking position; and a releasing driving portion for driving the locking executing portion to move away from the locking position under a second external force overcoming the resilient retaining force, the releasing driving portion driven by the second external force further generating an auxiliary pushing force along a direction of the resilient driving force for the ejecting executing portion swinging to the rear end of the connecting surface of the primary machine, and a resultant force of the resilient driving force and the auxiliary pushing force being larger than a coupling force between the secondary connector and the primary connector.

18. A primary and secondary machine module comprising:

a primary machine;

a secondary machine, the primary machine comprising a slot whereinto the secondary machine is inserted, and a primary connector installed at the bottom side of the slot for connecting with the secondary machine; and an ejecting mechanism, the ejecting mechanism comprising:

an ejecting executing portion swinging back and forth between a front end and a rear end of a connecting surface of the primary connector;

an ejecting driving portion sheathed on a shaft of the ejecting executing portion and for generating a resilient driving force to swing the ejecting executing portion toward the front end of the connecting surface of the primary connector;

an ejecting locking portion moving synchronously along with swing of the ejecting driving portion, wherein when a first external force overcomes the resilient driving force to push the secondary machine into the slot, so as to connect a secondary connector with the primary connector, the ejecting executing portion contacting with the secondary machine swings to the rear end of the connecting surface of the primary connector, such that the ejecting locking portion is located at a locking position;

a locking executing portion moving back and forth along a direction close to or away from the locking position, and the locking executing portion engaging with the ejecting locking portion at the locking position;

a locking retaining portion for generating a resilient retaining force to retain the locking executing portion close to the locking position; and a releasing driving portion for driving the locking executing portion to move away from the locking position under a second external force overcoming the resilient retaining force, the releasing driving portion driven by the second external force further generating an auxiliary pushing force along a direction of the resilient driving force for the ejecting executing portion swinging to the rear end of the connecting surface of the primary machine, and a resultant force of the resilient driving force and the auxiliary pushing force being larger than a coupling force between the secondary connector and the primary connector.

* * * * *